(12) United States Patent
Peltola

(10) Patent No.: US 6,600,818 B1
(45) Date of Patent: Jul. 29, 2003

(54) SYSTEM AND METHOD FOR CHANGING A-NUMBER

(75) Inventor: Hannu Peltola, Inkoo (FI)

(73) Assignee: Helsingin Puhelin Oyj-Helsingfors Telefon ABP, Helsinki (FI)

( * ) Notice: Subject to any disclaimer, the term of this patent is extended or adjusted under 35 U.S.C. 154(b) by 0 days.

(21) Appl. No.: 09/601,405

(22) PCT Filed: Feb. 5, 1999

(86) PCT No.: PCT/FI99/00083

§ 371 (c)(1),
(2), (4) Date: Aug. 1, 2000

(87) PCT Pub. No.: WO99/40714

PCT Pub. Date: Aug. 12, 1999

(30) Foreign Application Priority Data

Feb. 5, 1998 (FI) .................................................. 980264

(51) Int. Cl.[7] .............................................. H04M 3/42

(52) U.S. Cl. ............................ 379/201.01; 379/201.02; 379/207.02

(58) Field of Search ....................... 379/201.01, 201.02, 379/201.12, 207.02, 211.02, 216.01, 221.08, 221.09

(56) References Cited

U.S. PATENT DOCUMENTS 4,959,856 A  *  9/1990  Bischoff et al. ............ 379/245

* cited by examiner

Primary Examiner—Harry S. Hong
(74) Attorney, Agent, or Firm—Birch, Stewart, Kolasch & Birch, LLP

(57) ABSTRACT

A method and system for changing the state of an A-number. The system comprises control logic for implementing a service based on a B-number and control logic for identifying the calling A-number. The control logic of the system also provides for changing the state of the A-number automatically when the connection from said A number to the B-number has been established.

9 Claims, 4 Drawing Sheets

Operating principle of state machine

Basic model of state machine

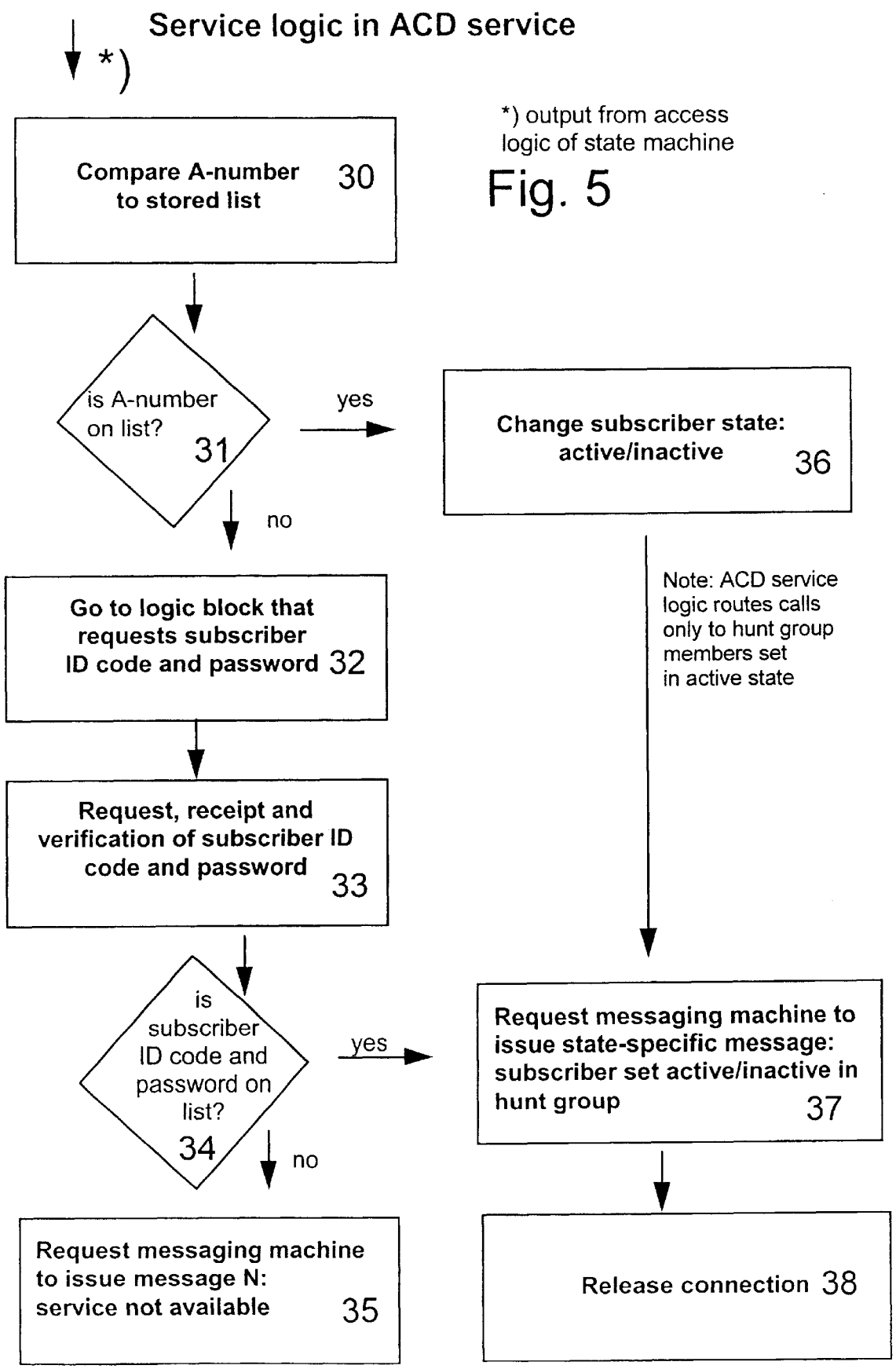

SYSTEM AND METHOD FOR CHANGING A-NUMBER

CROSS-REFERENCE TO RELATED APPLICATIONS

This application is the national phase under 35 U.S.C. §371 of PCT International Application No. PCT/FI99/00083 which has an International filing date of Feb. 5, 1999, which designated the United States of America.

The present invention relates to a system for changing the state of subscriber A-number.

BACKGROUND OF THE INVENTION

Currently, a plurality of telephone network accessibility services such as personal number and portable number features are provided to business and private subscribers. Typical for these services is that the subscriber number and the subscriber line need not be bundled together. Hence, the service subscriber can determine the physical telephone apparatus (subscriber line) to which calls coming to his number will be routed. However, these services typically are very complicated and clumsy to use. When the service subscriber wishes to make alterations, e.g., by assigning a new physical destination number for the personal number service to which incoming calls should be routed, he must first call a certain number given by the service provider, whereby an automatic voice messaging machine first requests the service subscriber to enter his subscriber identity code (typically having a length of 4–7 digits, e.g., in the format abc defg#) and then a password (typically of 4 digits, e.g., in the format hijk#); and after these operations the subscriber may possibly gain access to a menu in which a selection x permits the subscriber to dial a new physical destination number (e.g., in the format XYZ abcdefg#) to which he wishes his incoming call to be routed. Up to this moment, depending on the provided service the subscriber typically has been compelled to dial a total of some 19–32 digits.

SUMMARY AND OBJECTS OF THE INVENTION

It is an object of the invention to overcome the drawbacks of the above-described prior art and provide an entirely novel type of system and method for changing the state of subscriber A-number.

The invention is based on the idea that a certain B-number of the service provider is associated with a set of automatic subscriber A-number state changes that are activated simply by setting up a call. One embodiment of the invention is characterized by the use of tables that are activated simply by setting up a call. Each B-number of the service provider can activate a separate service. In addition to the number being activated, each B-number of the provided service may offer other selections for changing the parameters of the subscriber connection.

The invention offers significant benefits.

The invention makes it possible to readily control and change the control parameters of a telephone network associated with a given subscriber number. With the help of the present method, the subscriber can easily steer the call control routines associated with his accessibility number or alternatively, the forwarding of calls placed on the call hunt directory number of the network Automatic Call Distribution (ACD) service to the members of the hunt group. Both cases have in common that the subscriber can change the operation of the number control logic by a single call. In its simplest form, such a change is accomplished simply by pressing a single one-touch dial key of a telephone set, after which the service completes the routine. The caller identification is based on A-number and B-number tables stored in the telephone exchange register. As an optional feature, the service can be complemented with a password request (either in service- or subscriber-specific format). Furthermore, the subscriber can verify the state of the subscriber number control service by means of a single call.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 shows a simplified flow diagram of the ACD service according to the invention.

DETAILED DESCRIPTION OF THE PREFERRED INVENTION

Figure 1:
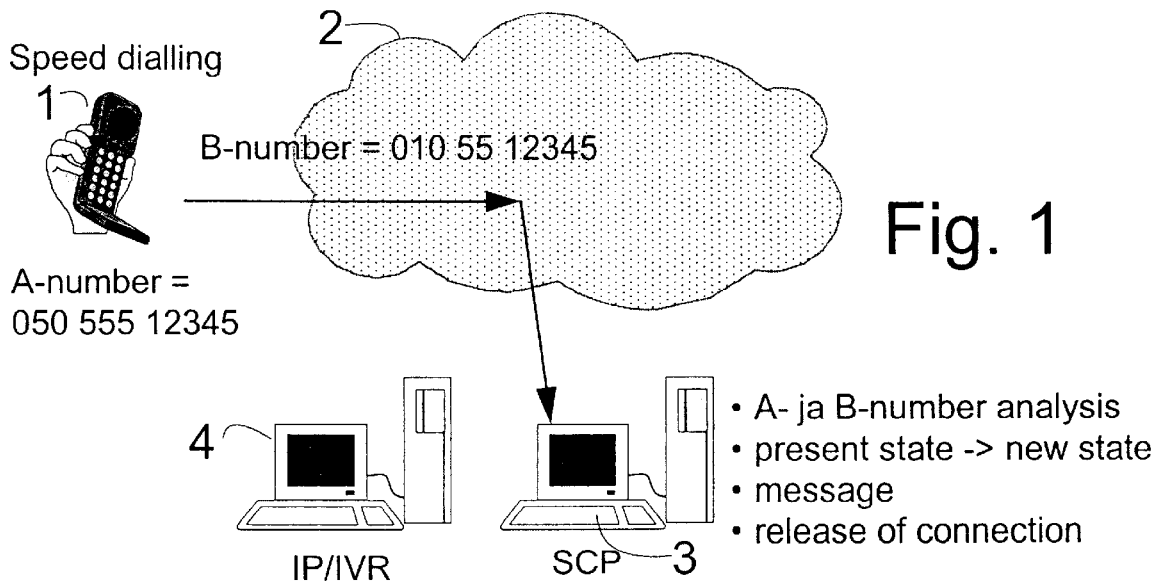
FIG. 1 shows diagrammatically an embodiment of the invention.

Referring to FIG. 1, therein is shown a feasible embodiment of a state machine.

The embodiment according to the invention typically comprises software executed on the Service Control Point (SCP 3) of an intelligent network 2, said software being written in such a eneric form that it can be linked to a plurality of different applications. The oftware contains paths via which the software can request a subroutine to be executed under another program or on hardware external to the SCP 3 such as IP quipment 4, for instance, after which the control is returned to the "state machine" program of SCP 3. The software control logic may also contain program witches by means of which the execution of a routine such as a password request, or instance, can be performed as required on a service-, situation- or subscribe related basis. Essentially, the basic function of the method according to the invention is a command "activate/inactivate"α, wherein α can be any parameter such as a telephone number, for instance. Based on the subscriber A-number, the command is performed relative to a given subscriber connection 1.

Figure 2:
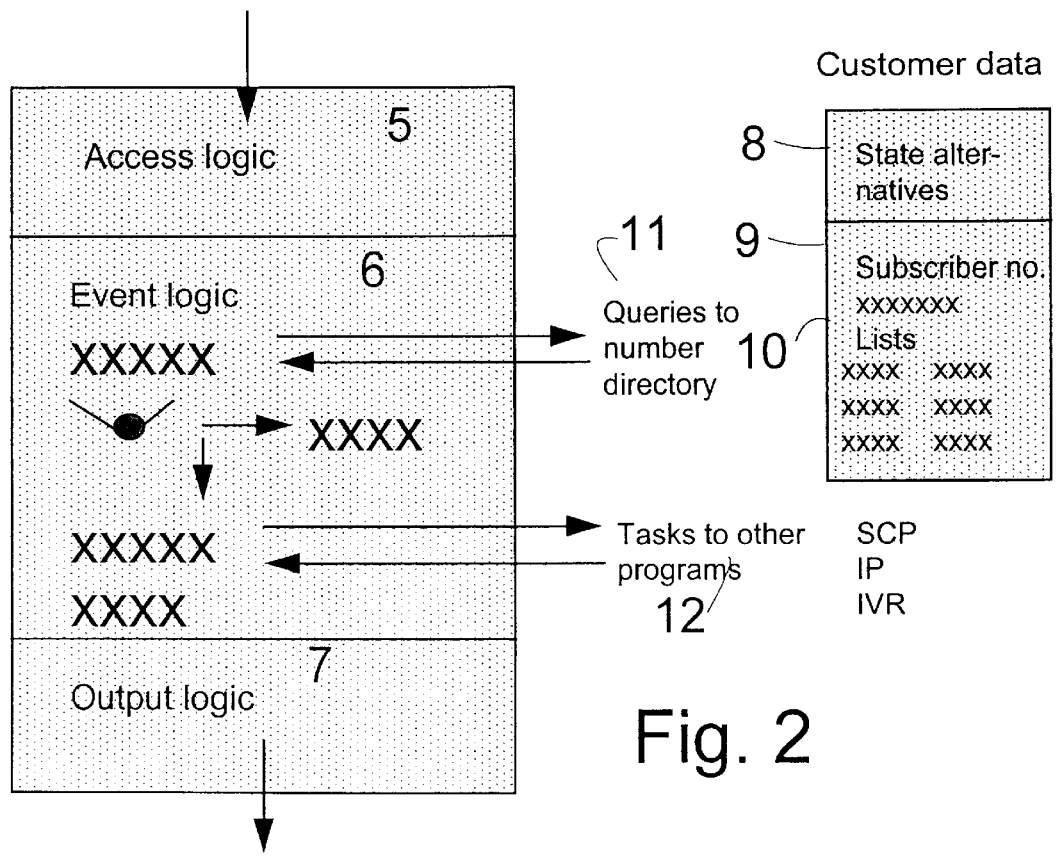
FIG. 2 shows a simplified flow diagram of the access logic control scheme according to the invention.

In FIG. 2 are shown the main blocks of the system according to the invention. The access logic 5 identifies the subscriber A-number and the event logic 6 performs on the basis of the event related to the service a query 11 to a data base containing the different state alternatives 8, the subscriber main number 9 and the optional lists 10 which are subscriber-specific and may be, e.g., different priority lists of the accessibility service. In block 12, the system invokes tasks to be executed by other programs, while the output logic block 2 handles the locally invoked routines and messages.

Figure 3:
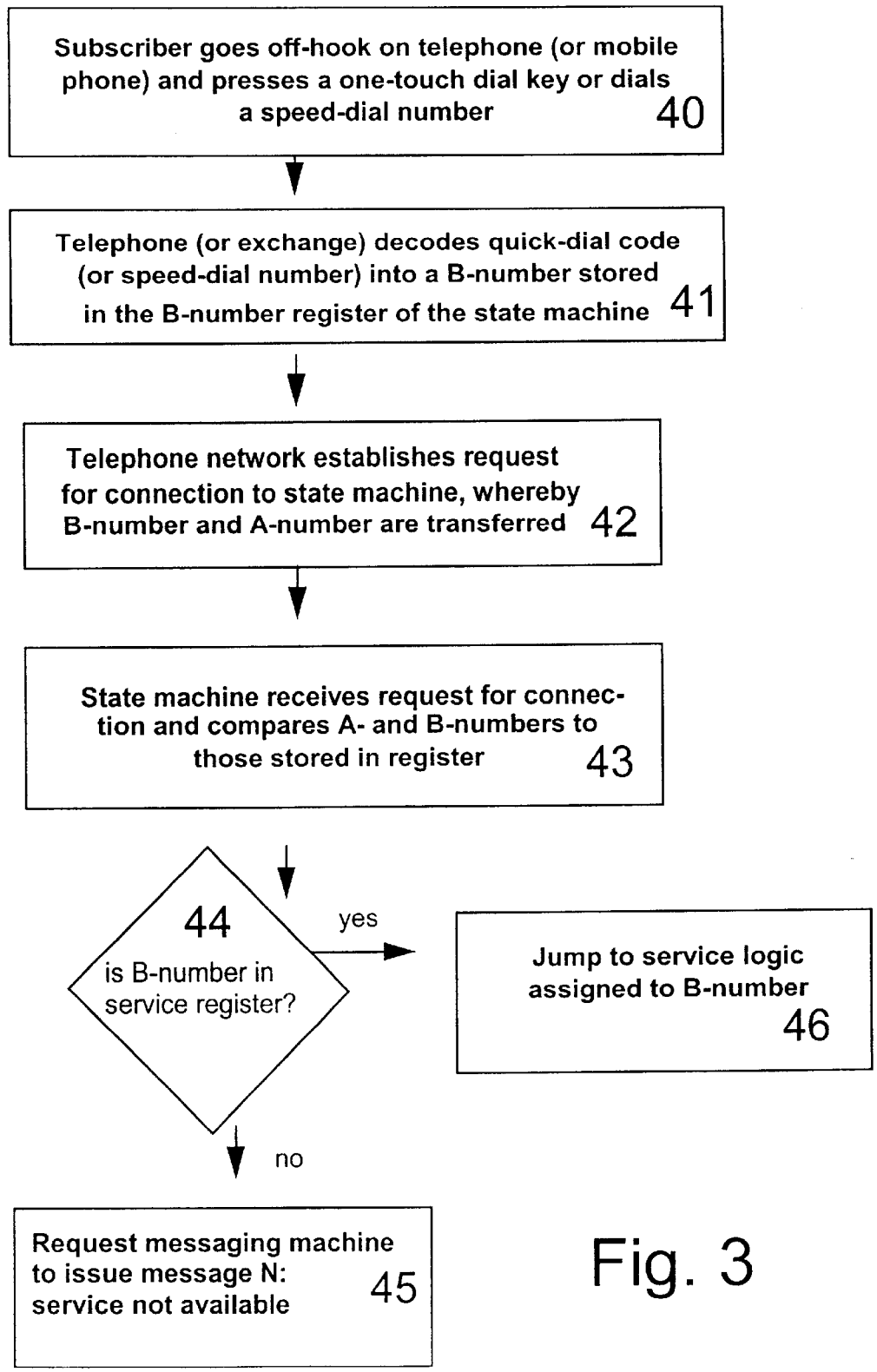
FIG. 3 shows a simplified flow diagram of the first steps of the method according to the invention.
Figure 4:
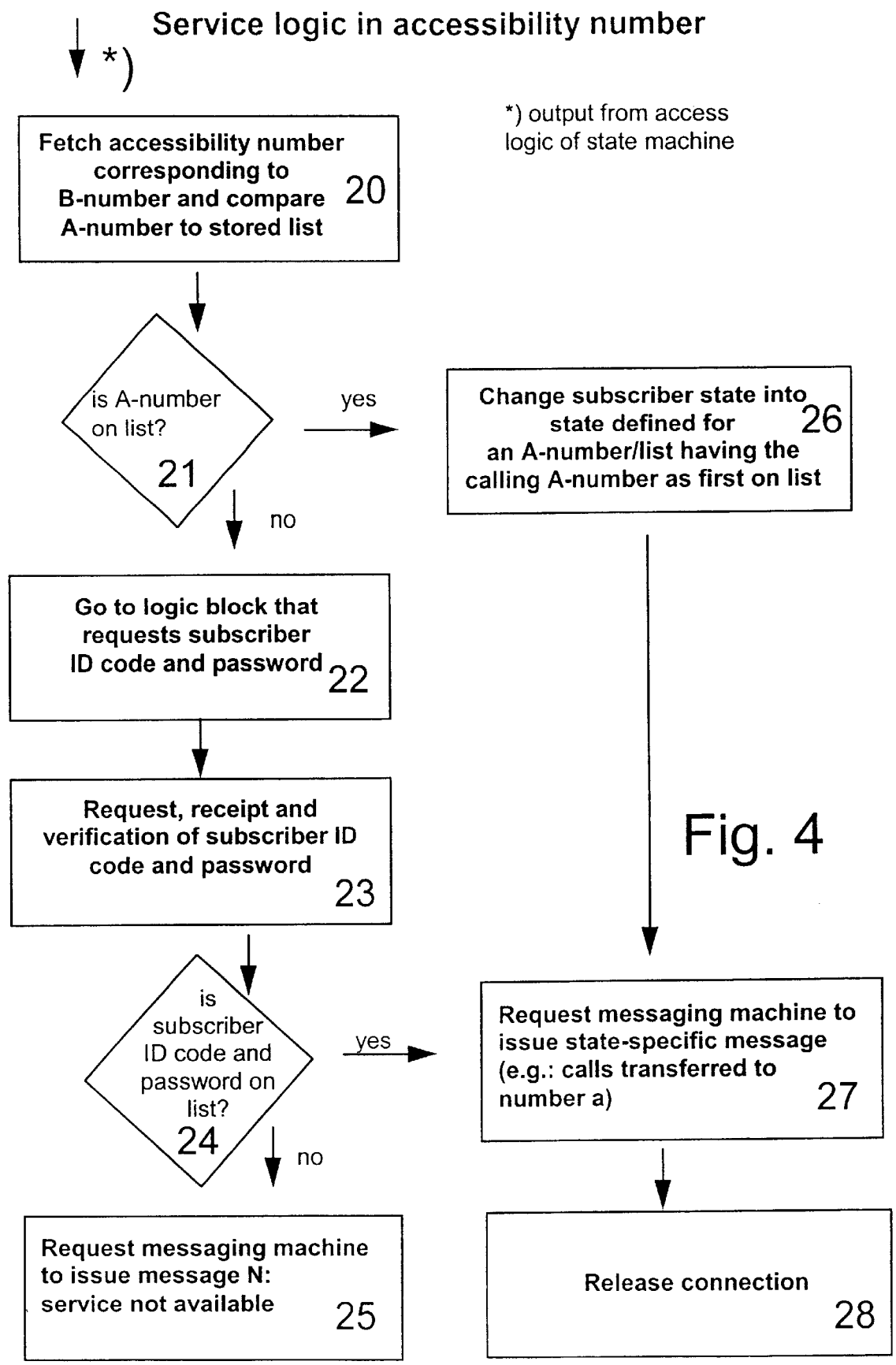
FIG. 4 shows a simplified flow diagram of the accessibility service according to the invention.

As shown in FIG. 3, the initial steps of the method according to the invention are carried out as follows. In block 40 the subscriber goes off-hook or opens a connection via his mobile phone and presses a one-touch dial key that calls the B-number of the service provider. Next, block 41 decodes the one-touch dial code into the B-number, after which the telephone network forms in block 42 a call request to the state machine of the system according to the invention, whereby both the A- and B-numbers are transferred in conjunction with the call request. The system according to the invention receives the call request in block 43 and subsequently compares the transferred A- and B-numbers with those stored in the register. In block 44 the B-number is verified to be stored in the service register. If the verification test is positive, the yes branch invokes block 46 that starts the service. A negative match of the B-number with those stored in the service register invokes the issuance of a message by block 45.

The use of the system in conjunction with a personal accessibility number is based on the capability of the system to perform the function activate/deactivate number a. The implementation of services can be carried out in a plurality of different ways of which the two most realistic ones are described in the following. Common to all embodiments is that the subscriber has a B-number as well as a plurality of A-numbers created in the register of the service. Activation takes place on the basis of the B-number received by the system and the stored list of A-numbers in blocks 20 and 21. The subscriber state is changed in block 26 provided that the A-number can be found from the stored list. This step is followed by the issuance of a message in block 27 and the connection is released in block 28. Additionally, a previously unknown A-number can be activated by means of blocks 22–24 after requesting the subscriber identification code and password (provided that the appropriate switch is set for the subscriber in the system control logic). If the password and subscriber ID code are not recognized herein, the subscriber receives from block 25 a message of the unavailability of the service.

Next, a practical example is described related to the reference numerals of FIG. 1, for instance. Herein, a set of physical telephone network numbers ranging from 1 to x is stored for the subscriber that can set calls placed on his accessibility number to be directed to these numbers. As in the previous example, the subscriber can change the state of the service by pressing a single one-touch dial key of the telephone apparatus 1. The apparatus calls then via the public telephone network 2 the system according to the invention, wherein the requested service and its subscriber are identified from the B-number and A-number associated with the call, and the received A-number is set as the active number. Subsequently, all calls placed on said subscriber will be directed to said A-number (that is, to the telephone apparatus 1 whose one-touch dial key was depressed). In telephone instruments having no one-touch dial key, an almost equally simple operation can be attained using speed-dial numbers (requiring dialling with 2 to 4 digits by the subscriber).

In the second example on the use of the accessibility number, the operation of the system is based on search lists. Herein, the term search list refers to a routine in which the telephone network 2 attempts to establish a call to the subscriber using the order of predetermined numbers stored in the search list: first calling number 1 of the list, and if this number does not respond, after a 15 s delay, for instance, placing the call on number 2 of the list, etc. In an application utilizing the system according to the invention, the system may store for the subscriber 1 a plurality of call lists, whose activities he can change by a single call (at best, by a single keystroke). In the same fashion as described earlier, the system identifies the service and the calling subscriber by the B-number and the A-number, respectively. In this embodiment, the system activates that call list on which the received A-number is the first number. Analogously to the previous example, the service invoked by an unknown A-number may be complemented if required with a subscriber ID code and password request routine, thus permitting the use of unlisted subscriber connection for controlling the accessibility number service. Herein, the A-number thus received will be stored in the temporary register of the system.

An example of the system use: subscriber X leaves his office, but forgets to perform call transfer from the office telephone to his mobile phone. Subscriber X opens a connection from his mobile phone 1 and presses a one-touch dial key K, whereby the call is directed to a system according to the invention. The system identifies the B-number, and based on the A-number, the subscriber X, after which the search list having the A-number (that is, the mobile phone number) as the first one on the list is activated for the subscriber. Thus, when a person Y calls the subscriber, the telephone network 2 primarily attempts to reach subscriber X on his mobile phone and in the case of an unsuccessful call attempt, the telephone network 2 next hunts the next number on the list that may be an answering machine, for instance.

In the ACD service of a telephone network, the utilization of the method according to the invention is carried out in the following manner as shown in FIG. 5. The member of a call hunt directory service has a subscriber-specific number of the method according to the invention stored under a one-touch dial key of his telephone set. Calls placed on the call hunt directory number of the telephone network are directed to members registered active in the hunt group. When a member of the call hunt directory number service wishes to activate or inactivate his connection in the hunt number list, he presses a one-touch dial key on his telephone set. Resultingly, a call is placed to the system managing said service, and the calling subscriber is identified by the received B-number and the registered A-number by blocks 30–31. If both numbers are found from the subscriber register in the decision process of block 31, the system according to the invention changes the state of the calling subscriber in the system register. If the subscriber number was in inactive state prior to this call, the system activates the number. Respectively, if the number was in active state, the system sets it in inactive state. The execution of this subroutine is followed by a message issued by block 37, after which the connection is released by block 38. A member of the call hunt directory number service can verify the state of his connection by dialling the same number used above for invoking the service. With the progress of the call, he can dial a digit (e.g., 1) from which the system recognizes an event associated with the subscriber's request for his connection's current state, whereby the system can issue the respective message (in the present case: active or inactive state). Thus, connection to a call hunt directory number service can be established at any time by a single keystroke and a member of the call hunt directory number service can attend his duty from any telephone apparatus connected to the public telephone network such as an office telephone, home telephone or mobile phone. In a customer-tailored service, the system can be complemented with an option allowing the subscriber to log into the call hunt directory number service also over a subscriber connection whose number is not included in the list of preset numbers by virtue of entering a valid subscriber ID code and password. To accomplish this option, a (software) switch of the system in its service activation logic branch is armed so that in conjunction with the identification of the known B-number and the unlisted A-number, the system requests the subscriber ID code and password in block 32. The entered password and subscriber ID code are verified by block 33. If the subscriber identification is successful, the software invokes block 37. Otherwise, a message of service unavailability is issued by block 35.

In one embodiment of the invention, the service provided to the subscriber number having the state control logic assigned thereto is controlled by the basic states (generally being 2) of the subscriber connection. The number lists possibly associated with these states are predefined when the subscriber contracts to the service, and these basic settings can be altered by a www-network based personal computer interface or via a telephone connection.

According to the invention, the subscriber can perform a simple change such as a rerouting change of the destination number of his accessibility number to the nearest telephone apparatus at his hand as simply as pressing a single key or using a speed-dialling feature (by pressing a few keys only) in the case that the telephone apparatus at hand has no one-touch dial key.

The invention facilitates easy access from the subscriber state change service to other service control logic branches such as those associated with changes of the accessibility number settings. This branching can be implemented to occur via pressing two or three code keys (e.g., by dialling 1# that takes the subscriber to a menu from which there is an access deeper in the menu depending on the implementation of the service such as submenus permitting the redefinition of settings, change of voice-mail box greetings message, checking the number of fax transmissions into the mail box, etc.)

The invention is based on generic software stored in the SCP data base of an intelligent network, said software being capable of threading subtasks amidst an ongoing subscriber session to other software blocks to be executed inside the SCP or on equipment external to the SCP such as IP equipment, or alternatively, of performing a query to an SDP data base external to the SCP. The generic software includes logic decision branches having service-specific switches (e.g., depending on the service to which the software is associated), response-specific switches (e.g., controlled by the response received by the software from a subroutine) or subscriber-specific switches (e.g., activated by an invoked password request subroutine).

The invention offers a manual technique of call answering control from a plurality of different types of telecommunications apparatuses, whereby accessibility can be assigned to a single number. The communications equipment may be any device having with a telephone interface that can be connected to a public telephone network such as a telephone exchange extension, a mobile phone, a domestic subscriber connection or a computer equipped with a sound card facility.

By virtue of the invention, a subscriber can log in and out as a member of an ACD call hunt directory number service of a telephone network simply by placing a single call. This operation may be carried out by pressing the one-touch dial key of a telephone apparatus or alternatively, by using its speed-dialling feature (e.g., in the case that the telecommunications device at hand has no one-touch dial key).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. System for changing the state of A-number, said system comprising
    means for implementing a service based on a B-number, and
    means for identifying said A-number, wherein:
        said system comprises means (5–12) for changing the state parameters of said A-number automatically when the connection from said A-number to said B-number has been established.

2. The system according to claim 1, wherein said state changing means (5–12) are adapted to change a certain state of said A-number from active state to inactive state.

3. The system according to claim 1, wherein said state changing means (5–12) are adapted to change a certain state of said A-number from inactive state to active state.

4. The system according to claim 1, wherein said state changing means (5–12) are adapted to change a certain state of said A-number so that the list of accessibility numbers is selected to be the accessibility list having the A-number as the first number on the list.

5. A method for changing the state of A-number, said method comprising the steps of
    calling from the A-number connection to the B-number of the provided service, and
    identifying said A-number of the calling subscriber at said service provider number, wherein
        when the connection to said service provider number has been established, the state parameters of said A-number connection are changed automatically.

6. The method according to claim 5, wherein the state of said A-number is changed from inactive to active state.

7. The method according to claim 5, wherein the state of said A-number is changed from active to inactive state.

8. The method according to claim 5, wherein the state of said A-number is changed by means of selecting the list of accessibility numbers to be the accessibility list having the A-number as the first number on the list.

9. The method according to claim 5, wherein the state of said A-number is changed active in the sequence of a call hunt directory number service.

\* \* \* \* \*